United States Patent
Su et al.

(10) Patent No.: US 10,964,975 B2
(45) Date of Patent: Mar. 30, 2021

(54) ELECTROLYTES FOR LITHIUM-ION BATTERIES

(71) Applicant: UChicago Argonne, LLC, Chicago, IL (US)

(72) Inventors: Chi Cheung Su, Westmont, IL (US); Khalil Amine, Oakbrook, IL (US); Meinan He, Sterling Heights, MI (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 259 days.

(21) Appl. No.: 16/250,333

(22) Filed: Jan. 17, 2019

(65) Prior Publication Data

US 2020/0235429 A1 Jul. 23, 2020

(51) Int. Cl.

| | |
|---|---|
| *H01M 10/0567* | (2010.01) |
| *H01M 10/0525* | (2010.01) |
| *H01M 4/505* | (2010.01) |
| *H01M 4/525* | (2010.01) |
| *H01M 4/38* | (2006.01) |
| *H01M 4/587* | (2010.01) |
| *H01M 4/36* | (2006.01) |
| *H01M 10/0568* | (2010.01) |

(52) U.S. Cl.
CPC ....... *H01M 10/0567* (2013.01); *H01M 4/364* (2013.01); *H01M 4/386* (2013.01); *H01M 4/505* (2013.01); *H01M 4/525* (2013.01); *H01M 4/587* (2013.01); *H01M 10/0525* (2013.01); *H01M 10/0568* (2013.01); *H01M 2300/0025* (2013.01)

(58) Field of Classification Search
CPC ............. H01M 4/364; H01M 10/0525; H01M 10/0567; H01M 10/0568; H01M 2300/0025

USPC ......................................................... 429/199
See application file for complete search history.

(56) References Cited

U.S. PATENT DOCUMENTS

| | | | |
|---|---|---|---|
| 9,373,867 B2 | 6/2016 | Kawasaki et al. | |
| 9,472,830 B2 | 10/2016 | Ahn et al. | |
| 9,484,598 B2 | 11/2016 | Jeon et al. | |
| 9,515,348 B2 | 12/2016 | Tokuda et al. | |
| 2011/0076572 A1 | 3/2011 | Amine et al. | |

FOREIGN PATENT DOCUMENTS

| | | |
|---|---|---|
| WO | WO-2015/051141 A1 | 4/2015 |
| WO | WO-2017/209762 A1 | 12/2017 |

OTHER PUBLICATIONS

U.S. Appl. No. 16/052,425, filed Aug. 1, 2018, Cheung et al.
Su et al., "Fluorinated Alkyl Substituted Sulfones as Electrolytes for High Voltage Lithium-Ion Battery," 227th ECS Meeting, May 2015 (Abstract Only). Accessed at http://ma.ecsdl.org/content/MA201501/2/416.abstract.
Su et al., "Oxidatively stable fluorinated sulfone electrolytes for high voltage high energy lithium-ion batteries," Energy Environ. Sci. 2017, 10, 900-904.

*Primary Examiner* — Sarah A. Slifka
(74) *Attorney, Agent, or Firm* — Foley & Lardner LLP (57) ABSTRACT

An electrochemic device includes an electrolyte that includes a compound according to Formula (I):

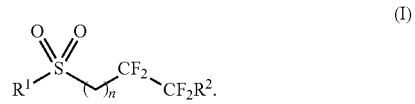

(I)

17 Claims, 9 Drawing Sheets

ELECTROLYTES FOR LITHIUM-ION BATTERIES

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to lithium rechargeable batteries. More particularly, the technology relates to electrolytes that include a fluorinated sulfone.

SUMMARY

In one aspect, an electrochemical device is provided, the electrochemical device including an electrolyte that includes a compound according to Formula (I):

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups.

The phrase "aryl groups" includes groups containing fused rings, such as fused aromatic-aliphatic ring systems (e.g., indanyl, tetrahydronaphthyl, and the like). Aryl groups may be substituted or unsubstituted. "Aralkyl" group are aryl groups that are connected to an alkyl, which is connected to the moiety being substituted.

The lithium-ion batteries described herein have an electrolyte that includes a tetrafluoroalkyl or perfluoroalkyl sulfone, to the exclusion of non-fluorinated carbonates. As will be shown below in more detail, the electrochemical performance of a graphite/NMC (nickel-manganese-cobalt-based electrode) cell employing a tetrafluoroalkyl sulfone, or a perfluoroalkyl sulfone as a co-solvent was improved significantly compared to the cell using conventional electrolytes based upon carbonates. Moreover, the flammability of tetrafluoro-alkyl sulfone is much lower than that of regular linear carbonates, resulting in an improvement in the safety of the battery. Cells having a graphite/NMC electrode and an electrolyte with a non-fluorinated sulfone or carbonate solvent displayed poor capacity retention, while the cells using 1,1,2,2-tetrafluoro-3-(methylsulfonyl)propane ("TFPMS"):

in the electrolyte, exhibited a significantly enhanced capacity retention (76.3% after 600 cycles). As a result, tetrafluoroalkyl, or perfluoroalkyl, sulfones are promising electrolyte solvents for lithium ion batteries.

In one aspect, an electrochemical devices is provided having a cathode having a voltage of greater than 4.2 V v. Li/Li$^+$, an anode, a separator; and an electrolyte, where the electrolyte includes a salt, a fluorinated sulfone, and a fluorinated carbonate, but where the electrolyte is substantially free of non-fluorinated carbonates. In the batteries, the anode includes lithium metal and one or more of natural graphite, synthetic graphite, hard carbon, amorphous carbon, soft carbon, mesocarbon microbeads, acetylene black, Ketjen black, carbon black, mesoporous carbon, porous carbon matrix, carbon nanotube, carbon nanofiber, graphene, a silicon-carbon composite, or a mixture of any two or more thereof. The fluorinated sulfone may be any sulfone of formula RS(O)$_2$R', where at least one of R or R' is an organic group containing at least one fluorine atom. In some embodiments, R, R', or both R and R' are alkyl groups and at least one of R and R' has a fluorine atom. In some embodiments, the fluorinate sulfone is compound of Formula (I).

In the electrochemical devices, the fluorinated sulfone represented by Formula (I) is:

(I)

where, R$^1$ is alkyl or fluorinated alkyl; R$^2$ is H, alkyl, fluorinated alkyl, aryl, or aralkyl; and n is 1, 2, or 3. In some embodiments, R$^1$ is —CH$_3$, —CH$_2$CH$_3$, —CH$_2$CH$_2$CH$_3$, —CH(CH$_3$)$_2$, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, —CH(CF$_3$)$_2$, —CF$_2$CF$_2$CF$_3$, —CF$_2$CF$_2$CHF$_2$, —CF$_2$CF$_2$CH$_3$, —CF$_2$CF$_2$CH$_2$F, —CH$_2$CF$_2$CF$_3$, —CH$_2$CF$_2$CHF$_2$, —CH$_2$CF$_2$CH$_3$, —CH$_2$CF$_2$CH$_2$F, —CHFCF$_2$CF$_3$, —CHFCF$_2$CHF$_2$, —CHFCF$_2$CH$_3$, —CHFCF$_2$CH$_2$F, —CF$_2$CH$_2$CF$_3$, —CF$_2$CH$_2$CHF$_2$, —CF$_2$CH$_2$CH$_3$, —CF$_2$CH$_2$CH$_2$F, —CF$_2$CHFCF$_3$, —CF$_2$CHFCHF$_2$, —CF$_2$CHFCH$_3$, —CF$_2$CHFCH$_2$F, —CHFCHFCF$_3$, —CHFCHFCHF$_2$, —CHFCHFCH$_3$, —CHFCHFCH$_2$F, —CH$_2$CH$_2$CF$_3$, —CH$_2$CH$_2$CHF$_2$, or —CH$_2$CH$_2$CH$_2$F; R$^2$ is H; and n is 1. In other embodiments, R$^1$ is —CH$_3$; R$^2$ is H; and n is 1.

In the electrochemical devices, the salt may be Li[CF$_3$CO$_2$]; Li[C$_2$F$_5$CO$_2$]; Li[ClO$_4$]; Li[BF$_4$]; Li[AsF$_6$]; Li[PF$_6$]; Li[PF$_2$(C$_2$O$_4$)$_2$]; Li[PF$_4$C$_2$O$_4$]; Li[CF$_3$SO$_3$]; Li[N(FSO$_2$)$_2$]; Li[N(CF$_3$SO$_2$)$_2$]; Li[C(CF$_3$SO$_2$)$_3$]; Li[N(SO$_2$C$_2$F$_5$)$_2$]; lithium alkyl fluorophosphates; Li[B(C$_2$O$_4$)$_2$]; Li[BF$_2$C$_2$O$_4$]; Li$_2$[B$_{12}$X$_{12-k}$H$_k$]; or Li$_2$[B$_{10}$X$_{10-k'}$H$_{k'}$]; wherein X is OH, F, Cl, or Br; k is an integer from 0 to 12; and k' is an integer from 0 to 10. In some embodiments, the salt is Li[PF$_6$] or Li[N(CF$_3$SO$_2$)$_2$], Li[N(FSO$_2$)$_2$], or a mixture thereof. In some embodiments, the salt is Li[N(FSO$_2$)$_2$]. In other embodiments, the salt consists of Li[PF$_6$] or Li[N(FSO$_2$)$_2$] or a mixture thereof. In yet other embodiments, the salt consists of Li[N(FSO$_2$)$_2$].

In the electrochemical devices, the fluorinated carbonate may include or a mixture thereof. In some embodiments, it includes the mono-fluoroethylenecarbonate, and in other embodiments, the di-fluoroethyelencarbonate.

In another aspect, an electrochemical device is provided including a cathode having a voltage of greater than 4.2 V v. Li/Li$^+$; an anode that includes lithium metal and one or more of natural graphite, synthetic graphite, hard carbon, amorphous carbon, soft carbon, mesocarbon microbeads, acetylene black, Ketjen black, carbon black, mesoporous carbon, porous carbon matrix, carbon nanotube, carbon nanofiber, graphene, and a silicon-carbon composite; a separator; and an electrolyte that includes lithium bis(fluorosulfonyl)imide, lithium bis(trifluoromethanesulfonyl)imide, or a mixture thereof; a fluorinated sulfone; and a fluorinated carbonate; where the electrolyte is substantially free of non-fluorinated carbonates. In some embodiments the fluorinated sulfone is represented by Formula (I):

(I)

R$^1$ is alkyl or fluorinated alkyl; R$^2$ is H, alkyl, fluorinated alkyl, aryl, or aralkyl; and n is 1, 2, or 3. In yet further embodiments, the fluorinated sulfone is TFPMS.

Any of the herein described electrochemical devices or lithium ion batteries may be a secondary lithium ion battery.

In the electrochemical devices described above, the cathode is a high voltage cathode. In some embodiments, this may include a cathode active material that is a spinel, an olivine, a carbon-coated olivine LiFePO$_4$, LiMn$_{0.5}$Ni$_{0.5}$O$_2$, LiCoO$_2$, LiNiO$_2$, LiNi$_{1-x}$Co$_y$Me$_z$O$_2$, LiNi$_\alpha$Mn$_\beta$Co$_{65}$ O$_2$, LiMn$_2$O$_4$, LiFeO$_2$, LiNi$_{0.5}$Me$_{1.5}$O$_4$, Li$_{1+x'}$, Ni$_h$Mn$_k$Co$_l$Me$^2{}_y$O$_{2-z}$F$_{z'}$, VO$_2$, or E$_{x''}$F$_2$(Me$_3$O$_4$)$_3$, LiNi$_m$Mn$_n$O$_4$, wherein Me is Al, Mg, Ti, B, Ga, Si, Mn, or Co; Me$^e$ is Mg, Zn, Al, Ga, B, Zr, or Ti; E is Li, Ag, Cu, Na, Mn, Fe, Co, Ni, or Zn; F is Ti, V, Cr, Fe, or Zr; wherein $0 \leq x \leq 0.3$; $0 \leq y \leq 0.5$; $0 \leq z \leq 0.5$; $0 \leq m \leq 2$; $0 \leq n \leq 2$; $0 \leq x' \leq 0.4$; $0 \leq \alpha \leq 1$; $0 \leq \beta \leq 1$; $0 \leq \gamma \leq 1$; $0 \leq h \leq 1$; $0 \leq k \leq 1$; $0 \leq l \leq 1$; $0 \leq y' \leq 0.4$; $0 \leq z' \leq 0.4$; and $0 \leq x'' \leq 3$; with the provisos that at least one of h, k and l is greater than 0, and at least one of x, y and z is greater than 0. In some embodiments, the cathode active material includes Li$_{1+w}$Mn$_x$Ni$_y$Co$_z$O$_2$ wherein w, x, y, and z satisfy the relations $0 < w < 1$, $0 \leq x < 1$, $0 \leq y < 1$, $0 \leq z < 1$, and $x+y+z=1$. In some embodiments, the cathode active material includes LiMn$_x$Ni$_y$O$_4$ wherein x and y satisfy the $0 \leq x < 2$, $0 \leq y < 2$, and $x+y=2$. In some embodiments, the positive electrode includes LiMn$_x$Ni$_y$O$_4$ wherein x and y satisfy the $0 \leq x < 2$, $0 \leq y < 2$, and $x+y=2$. In some embodiments, the positive electrode includes $x$Li$_2$MnO$_3$.(1−x)LiMO$_2$ is wherein $0 \leq x < 2$. In some embodiments, the cathode includes a cathode active material that is LiMn$_{0.5}$Ni$_{0.5}$O$_2$, LiCoO$_2$, LiNiO$_2$, LiNi$_{1-x}$Co$_y$Mn$_z$O$_2$, or a combination of any two or more thereof. In some embodiments, the cathode includes a cathode active material that is LiNi$_\alpha$Mn$_\beta$Co$_\gamma$O$_2$, NMC111 (LiNi$_{0.33}$Co$_{0.33}$Mn$_{0.33}$O$_2$), NMC532 (LiNi$_{0.5}$Co$_{0.2}$Mn$_{0.33}$O$_2$), NMC622 (LiNi$_{0.6}$Co$_{0.2}$Mn$_{0.2}$O$_2$), NMC811 (LiNi$_{0.8}$Co$_{0.1}$Mn$_{0.1}$O$_2$) or a Ni-rich layer material such as Li$_{1+x}$Ni$_h$Mn$_k$Co$_l$Me$^2{}_y$O$_{2-z}$F$_{z'}$ where $0 \leq h \leq 1$. In some embodiments, the cathode comprises LiMn$_{0.5}$Ni$_{0.5}$O$_2$, LiCoO$_2$, LiNiO$_2$, LiNi$_{1-x}$Co$_y$Mn$_z$O$_2$, or a combination of any two or more thereof, wherein $0 \leq x \leq 0.3$; $0 \leq y \leq 0.5$; $0 \leq z \leq 0.5$.

The cathode of the electrochemical devices may be stabilized by surface coating the active particles with a material that can neutralize acid or otherwise lessen or prevent leaching of the transition metal ions. Hence the cathodes can also comprise a surface coating of a metal oxide or fluoride such as ZrO$_2$, TiO$_2$, ZnO$_2$, WO$_3$, Al$_2$O$_3$, MgO, SiO$_2$, SnO$_2$, AlPO$_4$, Al(OH)$_3$, AlF$_3$, ZnF$_2$, MgF$_2$, TiF$_4$, ZrF$_4$, a mixture of any two or more thereof, of any other suitable metal oxide or fluoride. The coating may be applied to a carbon coated cathode.

The cathode of the electrochemical devices may be further stabilized by surface coating the active particles with polymer materials. Examples of polymer coating materials include, but not limited to, polysiloxanes, polyethylene glycol, or poly(3,4-ethylenedioxythiophene) polystyrene sulfonate, a mixture of any two or more polymers.

The electrodes (i.e., the cathode and/or the anode) of the electrochemical devices may also include a conductive polymer. Illustrative conductive polymers include, but not limited to, polyaniline, polypyrrole, poly(pyrrole-co-aniline), polyphenylene, polythiophene, polyacetylene, polysiloxane, or polyfluorene.

In the electrochemical devices described above, the cathode and/or anode may include a binder holding the active material, or other electrode materials in contact with the current collector. Illustrative binders include, but are not limited to, polyvinylidene difluoride (PVDF), poly(acrylic acid) (PAA), lithiated PAA, polyimide (PI), polyacrylonitrile (PAN), styrene-butadiene rubber (SBR), carboxymethyl cellulose (CMC), and combinations of any two or more thereof.

The electrodes of the electrochemical devices described herein may also include a current collector. Current collectors for either the anode or the cathode may include, but are not limited to, those of copper, stainless steel, titanium, tantalum, platinum, gold, aluminum, nickel, cobalt, cobalt nickel alloy, highly alloyed ferritic stainless steel containing molybdenum and chromium; or nickel-, chromium-, or molybdenum containing alloys. The electrodes (i.e., the cathode and/or the anode) may also include a binder and/or a conductive polymer as described above.

In the electrochemical devices described above, the separator may be a porous separator that is used to separate the cathode from the anode and prevent, or at least minimize, short-circuiting in the device. The separator may be a polymer or ceramic or mixed separator. The separator may include, but is not limited to, polypropylene (PP), polyethylene (PE), trilayer (PP/PE/PP), paper, or polymer films that may optionally be coated with alumina-based ceramic particles.

In the electrochemical devices described above, the electrolyte may also include an aprotic gel polymer.

The present invention, thus generally described, will be understood more readily by reference to the following examples, which are provided by way of illustration and are not intended to be limiting of the present invention.

EXAMPLES

The following compounds and abbreiviations are used herein: fluoroethylene carbonate (FEC), difluoroethylene carbonate (DFEC), 1,1,2,2-tetrafluoro-3-(methylsulfonyl) propane (TFPMS), ethyl methyl sulfone (EMS), and ethyl methyl carbonate (EMC):

Example 1. Synthesis of TFPMS. The synthesis of TFPMS was carried out according Scheme 1.

To a solution of HCF$_2$CF$_2$CH$_2$I (15.0 g) in diethyl ether (DEE) was added NaSCH$_3$ (4.3 g). The mixture was stirred overnight and the solvent was then removed. The crude H$_3$CSCH$_2$CF$_2$CHF$_2$ liquid was dissolved in dichloromethane and m-chloroperoxybenzoic acid ("m-CPBA," 10.7 g)

was added slowly to yield the TFPMS as a colorless liquid (3.2 g, 26.6%). The TFPMS was characterized by $^1$H, $^{13}$C, and $^{19}$F NMR. $^1$H NMR (CDCl$_3$, 300 MHz): δ5.92 (tt, 1H, J=52.8, J=3.9 Hz), 4.52 (tt, 2H, J=12.5 Hz, J=1.3 Hz), 3.09 (s, 3H); $^{13}$C NMR (CDCl$_3$, 75 MHz): δ113.3 (tt, J=249.5 Hz, J=28.3 Hz), 108.9 (tt, J=249.0 Hz, J=35.9 Hz), 63.6 (t, J=29.5 Hz), 37.8; $^{19}$F NMR (CDCl$_3$, 249 MHz): δ−123.9, −137.7.

Figure 1A:
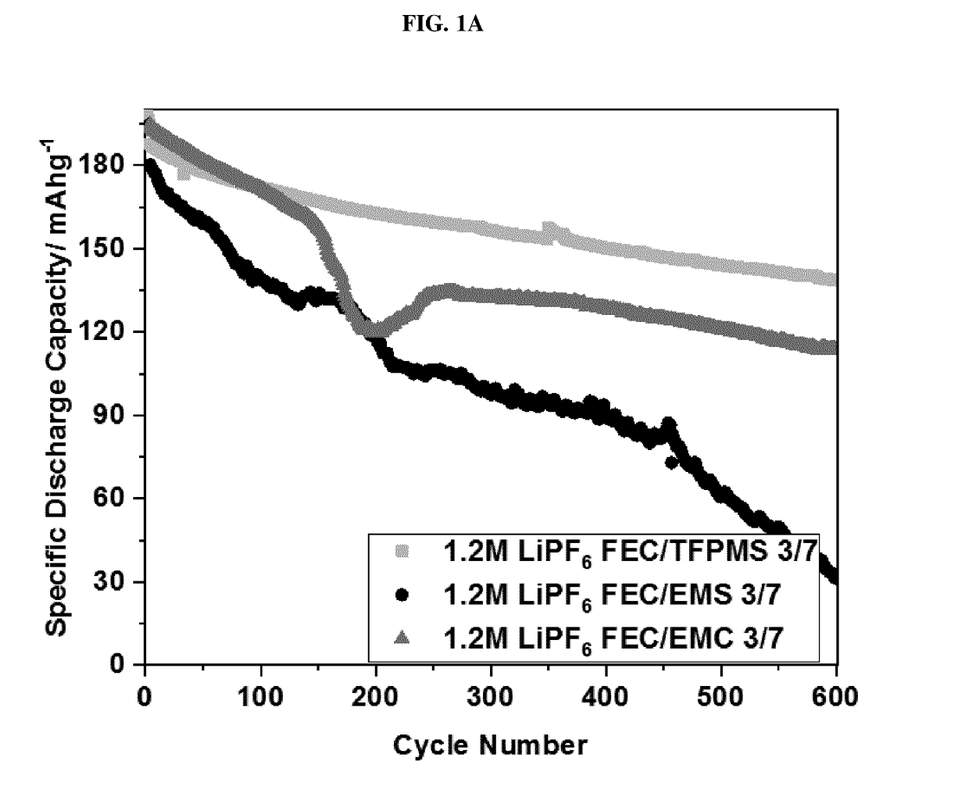
FIG. 1A is a capacity retention graph, and FIG. 1B a Coulombic efficiency graph for a graphite/LiNi$_{0.6}$Co$_{0.2}$Mn$_{0.2}$O$_2$ (known as NCM622) cell using different electrolytes based on fluoroethylenecarbonate, according to the examples.
Figure 1B:
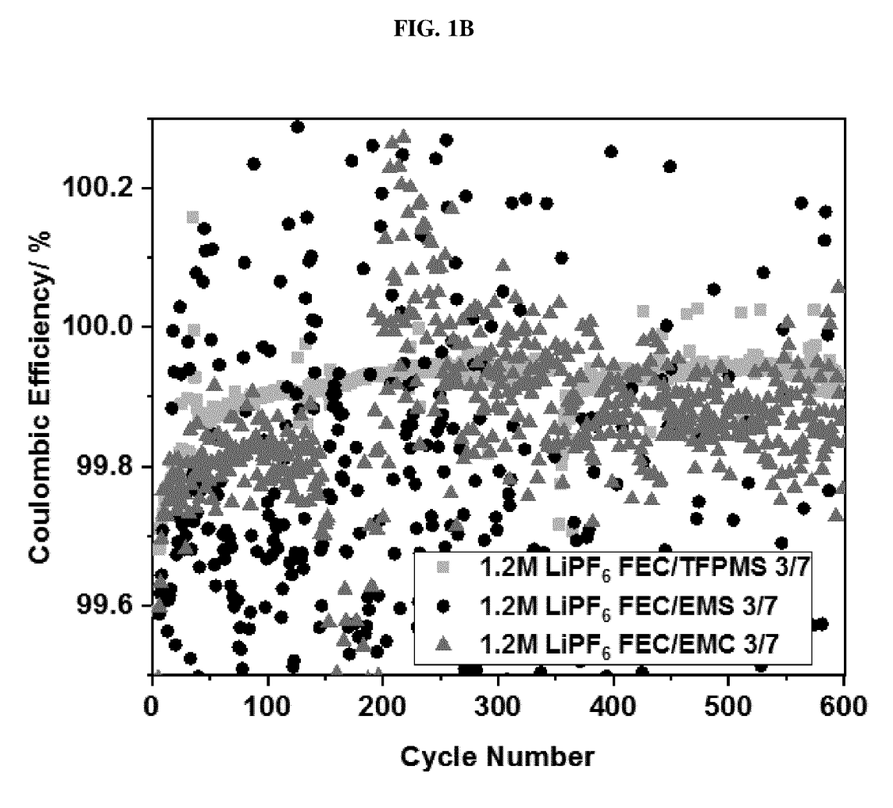

Example 2. Cells based on FEC. Graphite/NMC622 2032 coin cells were prepared using the following electrolytes: (A) 1.2M LiPF$_6$ FEC/EMS; 3:7; (B) 1.2M LiPF$_6$ FEC/EMC 3:7; and (C) 1.2 M LiPF$_6$ FEC/TFPMS 3:7. The cycling performance of cells A (Black circles), B (Grey triangles), and C (Light grey squares) was tested and is presented in FIGS. 1A (capacity retention) and 1B (Coulombic efficiency). During the cycling performance testing, FEC was added as a co-solvent with EMS, EMC, and, TFPMS, respectively, in cells A, B, and C. The capacity of cell A decayed rapidly, and after 600 cycles, the cell had only 17.3% capacity remaining. In comparison, the capacity of cell B was 58.2% after 600 cycles, and the capacity of cell C was, surprisingly, at 73.7% retention after 600 cycles. Furthermore, with respect to Coulombic efficiency, cell C (>99.9%) clearly outperformed both cells A and B. This indicates that the FEC/TFPMS electrolyte enabled stable cycling of the graphite/NMC622, high voltage system.

Figure 2A:
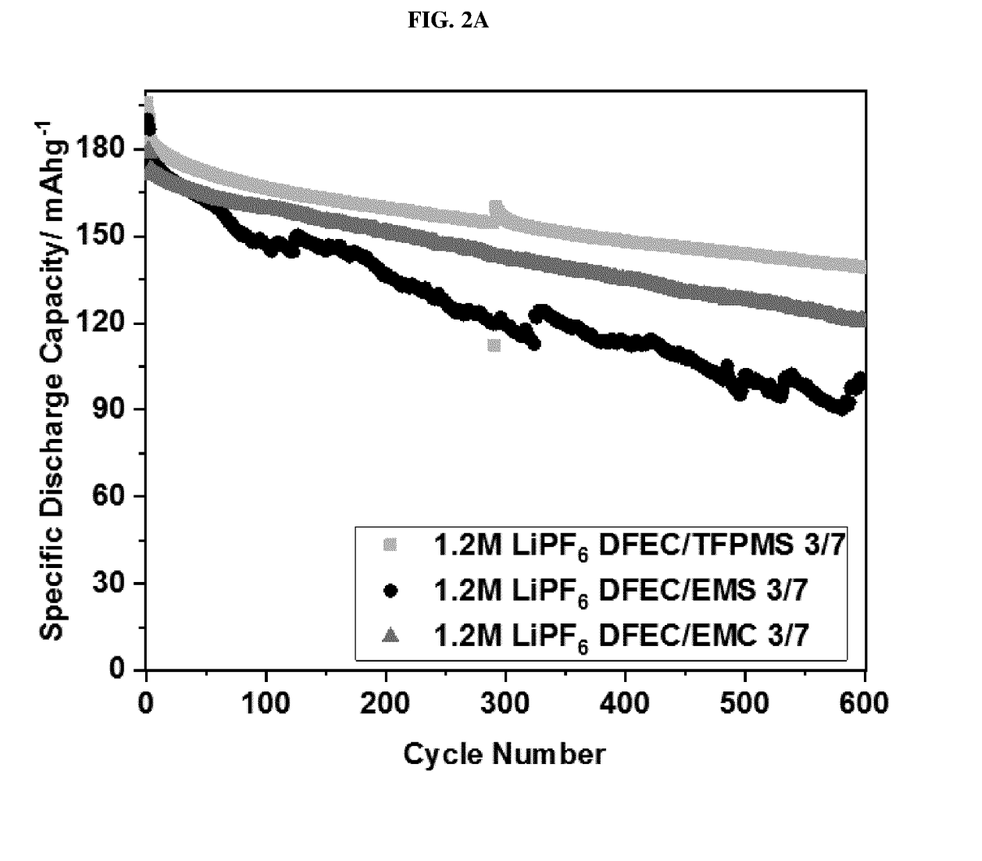
FIG. 2A is a capacity retention graph, and FIG. 2B a Coulombic efficiency graph for a graphite/NMC622 cell using different electrolytes based on difluoroethylenecarbonate, according to the examples.
Figure 2B:
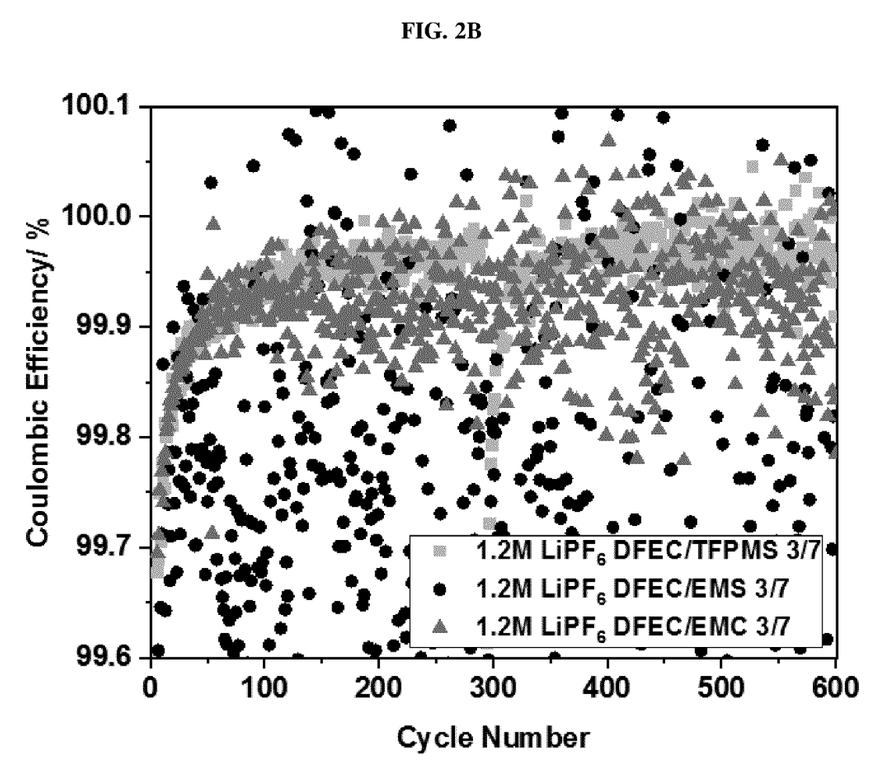

Example 3. Cells based on DFEC. Graphite/NMC622 2032 coin cells were prepared using the following electrolytes: (D) 1.2 M LiPF$_6$ DFEC/EMS; 3:7; (E) 1.2 M LiPF$_6$ DFEC/EMC 3:7; and (F) 1.2 M LiPF$_6$ DFEC/TFPMS 3:7. The cycling performance of cells D (Black circles), E (Grey triangles), and F (Light grey squares) was tested and is presented in FIGS. 2A (capacity retention) and 2B (Coulombic efficiency). During the cycling performance testing, FEC was added as a co-solvent with EMS, EMC, and, TFPMS, respectively, in cells D, E, and F. The capacity of cell D decayed rapidly, and after 600 cycles the capacity retention was at 56.3%. In comparison, the capacity decay of cell E was much slower than that of cell D, and after 600 cycles the capacity retention was at 69.4%. However, the capacity of cell F was, surprisingly, at 76.3% retention after 600 cycles. Furthermore, with respect to the average 600-cycle Coulombic efficiency, cell F (>99.95%) clearly outperformed both cells D and E. This indicates that the DFEC/TFPMS electrolyte enables stable cycling of the graphite/NMC622, high voltage system, to an even greater degree than in Example 2.

Example 4. Flammability testing. A cotton swab was soaked in an electrolyte solution of 1.2 M LiPF$_6$ FEC/EMC 3:7. When a flame was held to the cotton swab, it ignited and remained burning when the flame was removed. However, under the same conditions with an electrolyte solution of 1.2 M LiPF$_6$ FEC/TFPMS 3:7, the swab self-extinguished upon removal of the flame.

Figure 3A:
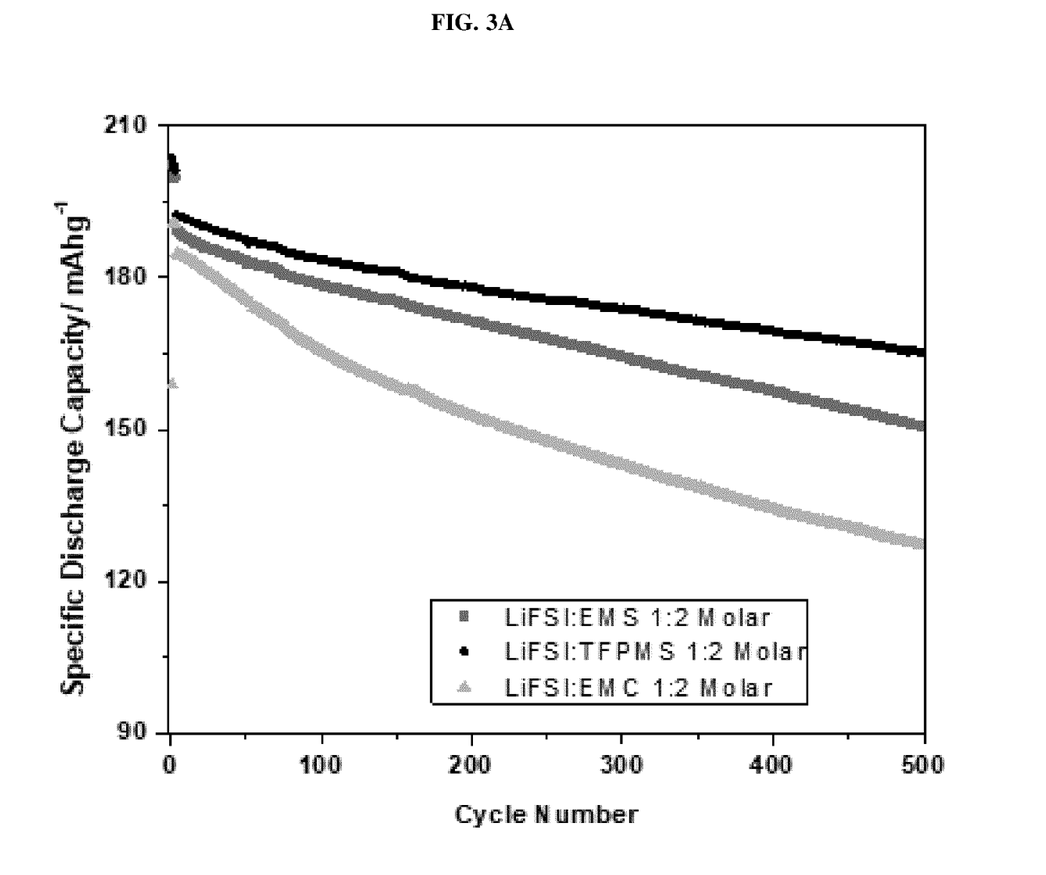
FIG. 3A is a capacity retention graph, and FIG. 3B a Coulombic efficiency graph for a graphite/NCM622 cell using different electrolyte solvents with lithium bis(fluorosulfonyl)imide (LiFSI), according to the examples.
Figure 3B:
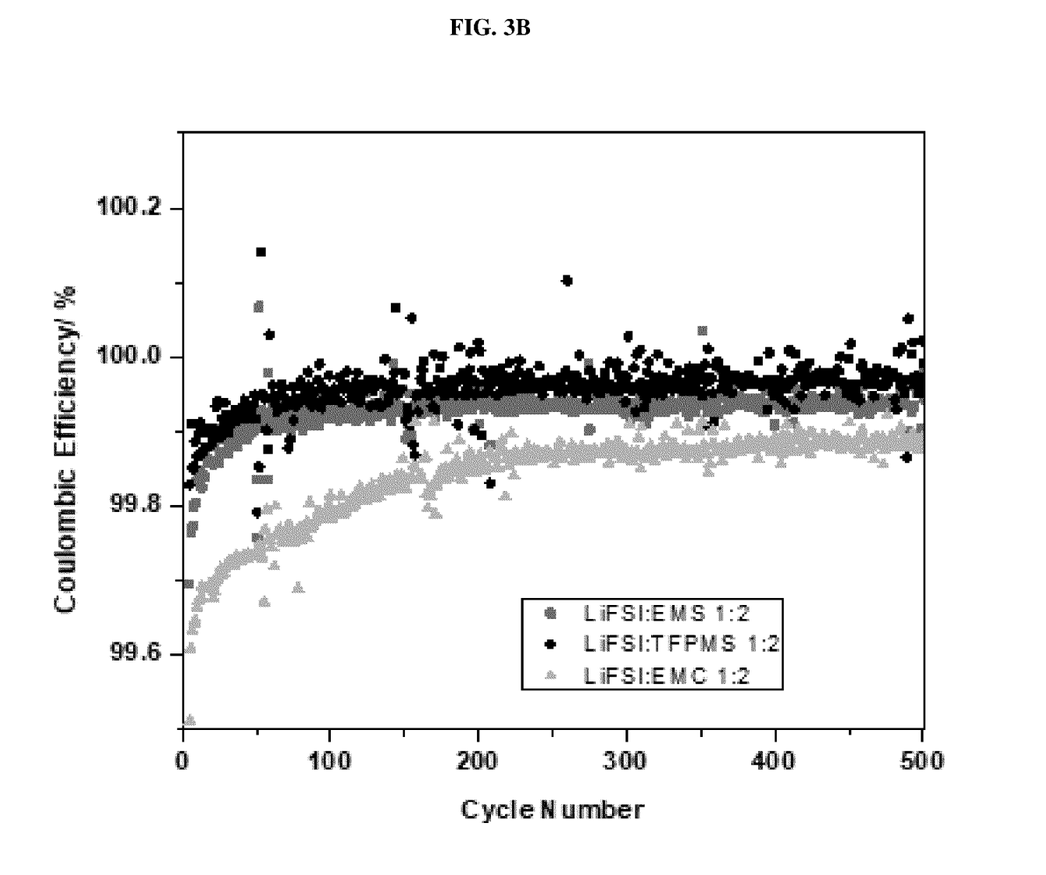

Example 5. Graphite/NMC622 2032 coin cells were prepared using the following electrolytes: (A) LiFSI and EMC mixed in a 1:2 molar ratio; (B) LiFSI and EMS mixed in a 1:2 molar ratio; and (C) LiFSI and TFPMS mixed in a 1:2 molar ratio. The cycling performance of cells A (triangles, light grey), B (squares, grey), and C (circles, black) was tested and is presented in FIGS. 3A (capacity retention) and 3B (Coulombic efficiency). The cycling performance testing illustrates that a cell based upon LFSI and a non-fluorinate carbonate that is widely used in lithium ion cells, loses substantial capacity over extended cycling. While it is observed that changing the carbonate to a similarly structured sulfone improves cycling, the change to a fluorinated sulfone (TFPMS) with the LiFSI significantly improves the capacity retention. The capacity of cell A decayed rapidly and after 500 cycles the capacity retention was at 68.7% with average specific capacity 149.7 mAh/g. In comparison, the capacity decay of cell D was much slower than that of cell A, and after 500 cycles the capacity was at 79.4% with average specific capacity 167.9 mAh/g. However, the capacity of cell C was, surprisingly, at 85.8% retention after 500 cycles with average specific capacity 176.4 mAh/g. Furthermore, with respect to the average 500-cycle Coulombic efficiency, cell B (>99.95%) clearly outperformed both cells A (99.84%) and B (99.92%).

Figure 4A:
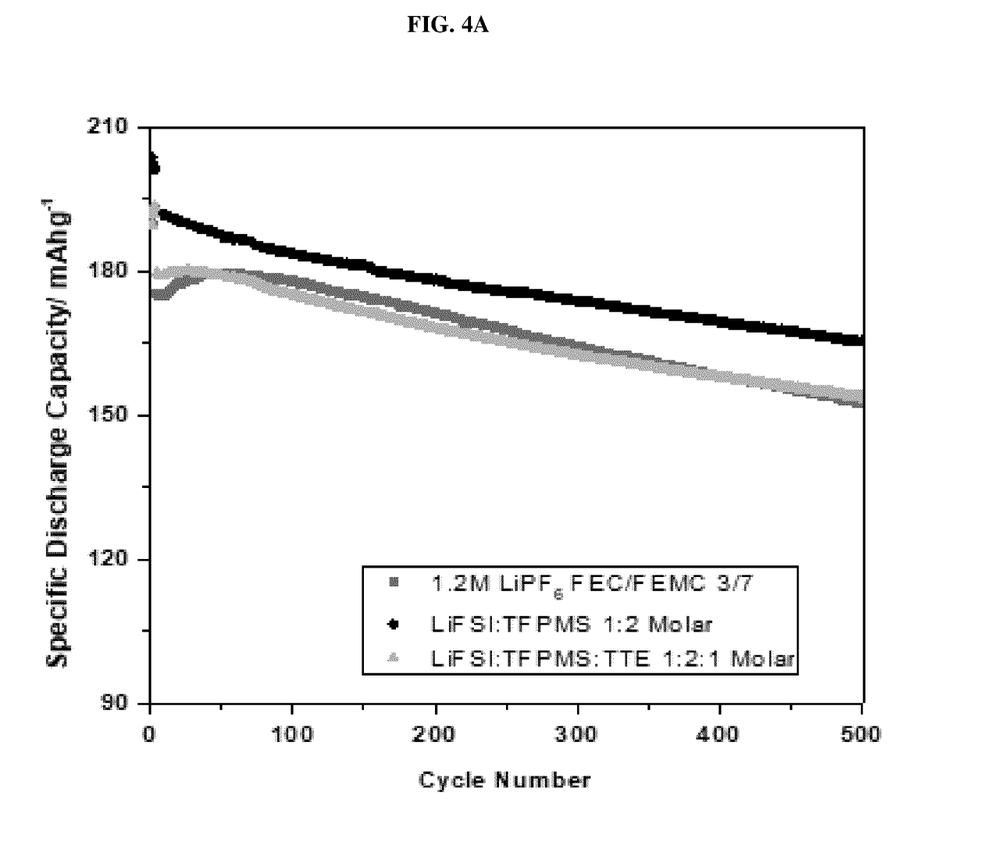
FIG. 4A is a capacity retention graph, and FIG. 4B a Coulombic efficiency graph for a graphite/NMC622 cell using different electrolytes, according to the examples.
Figure 4B:
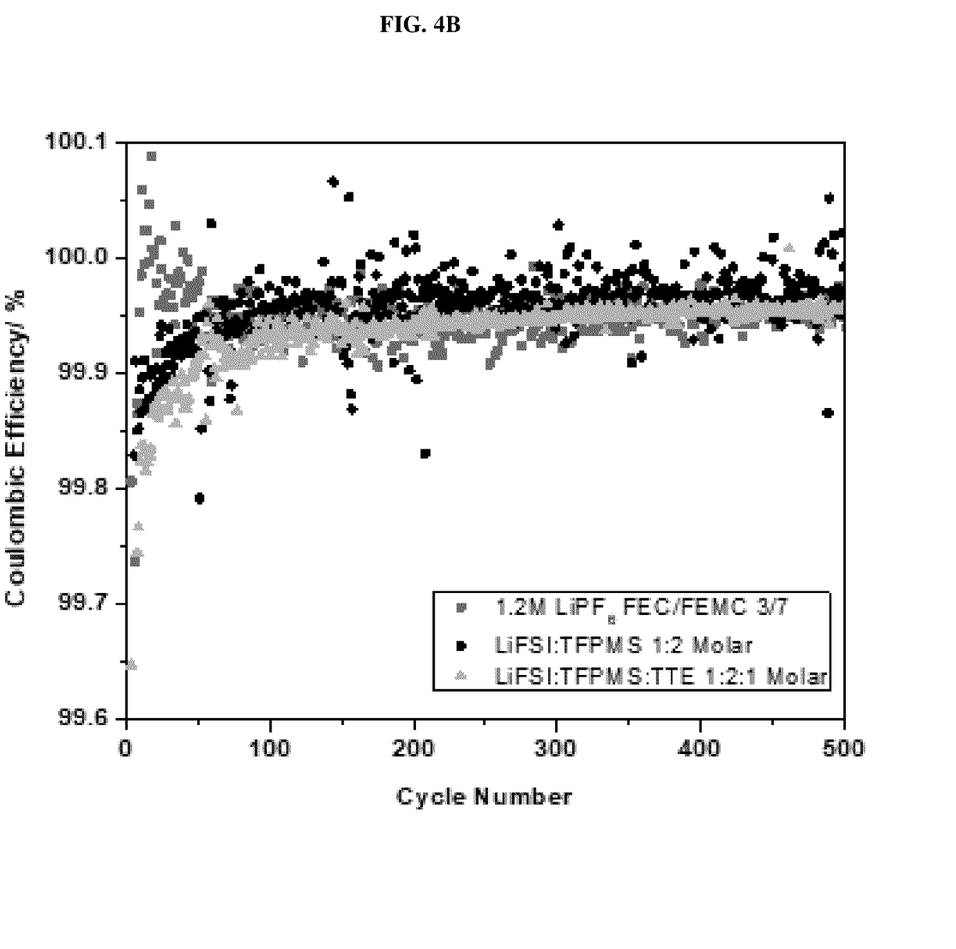

Example 6. Graphite/NMC622 2032 coin cells were prepared using the following electrolytes: (A) 1.2 M LiPF$_6$ in FEC/FEMC 3:7; (B) LiFSI and TFPMS and TTE (HF$_2$CCF$_2$OCH$_2$CF$_2$CF$_2$H) mixed in a 1:2:1 molar ratio; and (C) LiFSI and TFPMS mixed in a 1:2 molar ratio. The cycling performance of cells A (grey circles), B (triangles, light grey), and C (black circles) was tested and is presented in FIGS. 4A (capacity retention) and 4B (Coulombic efficiency). The capacity decay of both cell A, B and C decayed roughly at the same rate with 500-cycle capacity retention 86.9%, 85.6% and 85.8% respectively. The 500-cycle average specific capacity of cell B is 165.9 mAh/g, which is very close to that of cell A 167.1 mAh/g. Also, the 500-cycle Coulombic efficiency of both cell A, B and C is >99.92%, indicating stable cycling performance Since FEC/FEMC fluorinated carbonate electrolyte represents one of the best electrolytes dedicated to high voltage cathode, the results demonstrated that LiFSI and TFPMS and TTE (HF$_2$CCF$_2$OCH$_2$CF$_2$CF$_2$H) mixed in a 1:2:1 molar ratio is also a promising candidate for high voltage operation.

Figure 5:
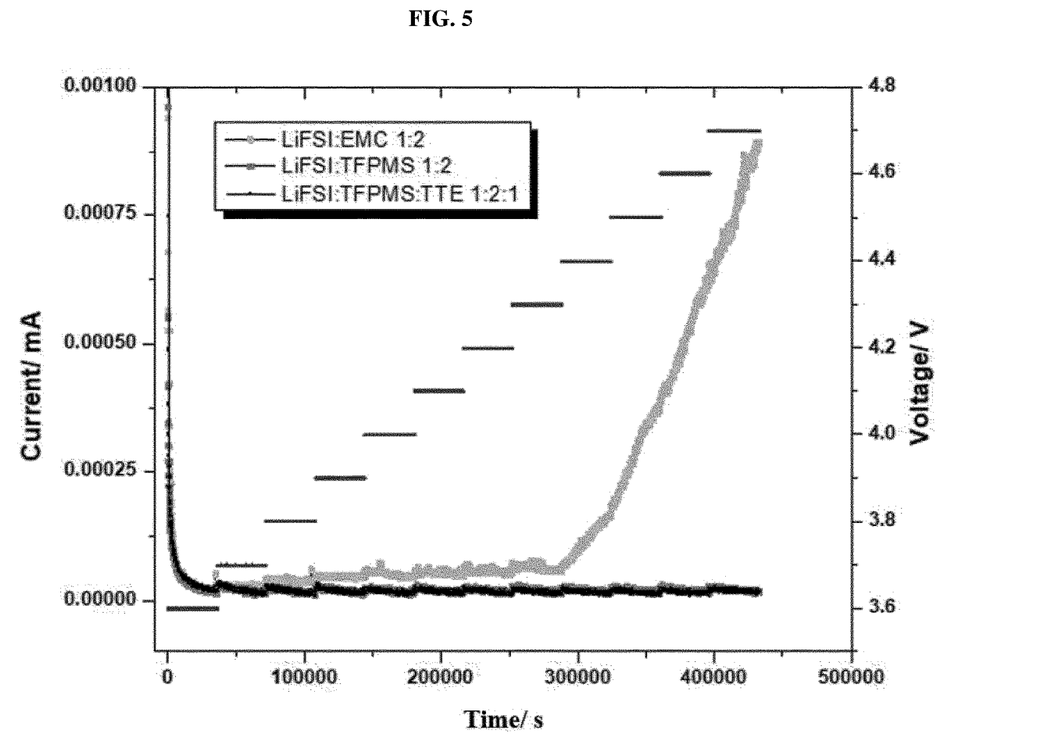
FIG. 5 is a chronoamprogram for a lithium/aluminum cell using different electrolytes based on LFSI, according to the examples.

Example 7. Li/Al (lithium/aluminum) 2032 coin cells were prepared using the following electrolytes: (A) LiFSI and EMC mixed in a 1:2 molar ratio; (B) LiFSI and TFPMS mixed in a 1:2 molar ratio; and (C) LiFSI and TFPMS and TTE (HF$_2$CCF$_2$OCH$_2$CF$_2$CF$_2$H) mixed in a 1:2:1 molar ratio. The chronoamperogram for cells A (light grey), B (grey), and C (black) were recorded and are presented in FIG. 5. The chronoamperogram clearly displays the sudden increase of leakage current at 4.4V for cell A, indicating the onset of aluminum corrosion of cell A. Where aluminum is the cathode current collector, the corrosion of aluminum imposes non-negligible problems for LiFSI/EMC electrolytes. However, the leakage current of cell B and C does not increase drastically throughout the test, implying that aluminum corrosion does not occur below 4.7V. Thus, LiFSI/TFPMS is a promising candidate for high voltage cathode.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrochemical device comprising:
a cathode having a voltage of greater than 4.2 V v. Li/Li$^+$;
an anode comprising lithium metal and one or more of natural graphite, synthetic graphite, hard carbon, amorphous carbon, soft carbon, mesocarbon microbeads, acetylene black, Ketjen black, carbon black, mesoporous carbon, porous carbon matrix, carbon nanotube, carbon nanofiber, graphene, and a silicon-carbon composite;
a separator; and
an electrolyte comprising:
a salt;
a fluorinated sulfone represented by Formula (I); and
a fluorinated carbonate;
wherein:
the electrolyte is substantially free of non-fluorinated carbonates;
the fluorinated sulfone represented by Formula (I) is:

$R^1$ is alkyl or fluorinated alkyl;
$R^2$ is H, alkyl, fluorinated alkyl, aryl, or aralkyl; and
n is 1, 2, or 3.

2. The electrochemical device of claim 1, wherein $R^1$ is —CH$_3$, —CH$_2$CH$_3$, —CH$_2$CH$_2$CH$_3$, —H(CH$_3$)$_2$, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, —CH(CF$_3$)$_2$, —CF$_2$CF$_2$CF$_3$, —CF$_2$CF$_2$CHF$_2$, —CF$_2$CF$_2$CH$_3$, —CF$_2$CF$_2$CH$_2$F, —CH$_2$CF$_2$CF$_3$, —CH$_2$CF$_2$CHF$_2$, —CH$_2$CF$_2$CH$_3$, —CH$_2$CF$_2$CH$_2$F, —CHFCF$_2$CF$_3$, —CHFCF$_2$CHF$_2$, —CHFCF$_2$CH$_3$, —CHFCF$_2$CH$_2$F, —CF$_2$CH$_2$CF$_3$, —CF$_2$CH$_2$CHF$_2$, —CF$_2$CH$_2$CH$_3$, —CF$_2$CH$_2$CH$_2$F, —CF$_2$CHFCF$_3$, —CF$_2$CHFCHF$_2$, —CF$_2$CHFCH$_3$, —CF$_2$CHFCH$_2$F, —CHFCHFCF$_3$, —CHFCHFCHF$_2$, —CHFCHFCH$_3$, —CHFCHFCH$_2$F, —CH$_2$CH$_2$CF$_3$, —CH$_2$CH$_2$CHF$_2$, or —CH$_2$CH$_2$CH$_2$F; $R^2$ is H; and n is 1.

3. The electrochemical device of claim 2, wherein $R^1$ is —CH$_3$; $R^2$ is H; and n is 1.

4. The electrochemical device of claim 3, wherein the salt consists of Li[N(FSO$_2$)$_2$].

5. The electrochemical device of claim 1, wherein the salt comprises Li[CF$_3$CO$_2$]; Li[C$_2$F$_5$CO$_2$]; Li[ClO$_4$]; Li[BF$_4$]; Li[AsF$_6$]; Li[PF$_2$(C$_2$O$_4$)$_2$]; Li[PF$_4$C$_2$O$_4$]; Li[CF$_3$SO$_3$]; Li[N(FSO$_2$)$_2$]; Li[N(CF$_3$SO$_2$)$_2$]; Li[C(CF$_3$SO$_2$)$_3$]; Li[N(SO$_2$C$_2$F$_5$)$_2$]; lithium alkyl fluorophosphates; Li[B(C$_2$O$_4$)$_2$]; Li[BF$_2$C$_2$O$_4$]; Li$_2$[B$_{12}$X$_{12-k}$H$_k$]; or Li$_2$[B$_{10}$X$_{10-k'}$]; wherein X is OH, F, Cl, or Br; k is an integer from 0 to 12; and k' is an integer from 0 to 10.

6. The electrochemical device of claim 1, wherein the salt comprises Li[PF$_6$] or Li[N(CF$_3$SO$_2$)$_2$], Li[N(FSO$_2$)$_2$], or a mixture thereof.

7. The electrochemical device of claim 1, wherein the salt comprises Li[N(FSO$_2$)$_2$].

8. The electrochemical device of claim 1, wherein the salt consists of Li[PF$_6$] or Li[N(FSO$_2$)$_2$] or a mixture thereof.

9. The electrochemical device of claim 1, wherein the salt consists of Li[N(FSO$_2$)$_2$].

10. The electrochemical device of claim 1, wherein the fluorinated carbonate comprises:

or a mixture thereof.

11. The electrochemical device of claim 1, wherein the electrolyte further comprises an aprotic gel polymer.

12. The electrochemical device of claim 1 that is a lithium secondary battery.

13. The electrochemical device of claim 1, wherein the cathode comprises a spinel, an olivine, a carbon-coated olivine $LiMn_{0.5}Ni_{0.5}O_2$, $LiCoO_2$, $LiNiO_2$, $LiNi_{1-x}Co_yMe_zO_2$, $LiNi_\alpha Mn_\beta Co_\gamma O_2$, $LiMn_2O_4$, $LiFeO_2$, $LiNi_{0.5}Me_{1.5}O_4$, $Li_{1+x}Ni_hMn_kCo_lMe^2_{y'}O_{2-z'}F_{z'}$, $VO_2$, or $E_{x''}F_2(Me_3O_4)_3$, $LiNi_mMn_nO_4$, wherein Me is Al, Mg, Ti, B, Ga, Si, Mn, or Co; $Me^2$ is Mg, Zn, Al, Ga, B, Zr, or Ti; E is Li, Ag, Cu, Na, Mn, Fe, Co, Ni, or Zn; F is Ti, V, Cr, Fe, or Zr; wherein $0 \le x \le 0.3$; $0 \le y \le 0.5$; $0 \le z \le 0.5$; $0 \le m \le 2$; $0 \le n \le 2$; $0 \le x' \le 0.4$; $0 \le \alpha \le 1$; $0 \le \beta \le 1$; $0 \le \gamma \le 1$; $0 \le h \le 1$; $0 \le k \le 1$; $0 \le l \le 1$; $0 \le y' \le 0.4$; $0 \le z' \le 0.4$; and $0 \le x'' \le 3$; with the provisos that at least one of h, k and l is greater than 0, and at least one of x, y and z is greater than 0.

14. The electrochemical device of claim 1, wherein the cathode comprises $LiMn_{0.5}Ni_{0.5}O_2$, $LiCoO_2$, $LiNiO_2$, $LiNi_{1-x}Co_yMn_zO_2$, or a combination of any two or more thereof, wherein $0 \le x \le 0.3$; $0 \le y \le 0.5$; $0 \le z \le 0.5$.

15. The electrochemical device of claim 1, wherein:
the cathode comprises $LiNi_{0.33}Co_{0.33}Mn_{0.33}O_2$, $LiNi_{0.5}Co_{0.2}Mn_{0.3}O_2$, $LiNi_{0.6}Co_{0.2}Mn_{0.2}O_2$, or $LiNi_{0.8}Co_{0.1}Mn_{0.1}O_2$;
the salt comprises lithium bis(fluorosulfonyl)imide; and
and the fluorinated sulfone is 1,1,2,2-tetrafluoro-3-(methylsulfonyl)propane.

16. An electrochemical device comprising:
a cathode having a voltage of greater than 4.2 V v. $Li/Li^+$;
an anode comprising lithium metal and one or more of natural graphite, synthetic graphite, hard carbon, amorphous carbon, soft carbon, mesocarbon microbeads, acetylene black, Ketjen black, carbon black, mesoporous carbon, porous carbon matrix, carbon nanotube, carbon nanofiber, graphene, and a silicon-carbon composite;
a separator; and
an electrolyte comprising:
lithium bis(fluorosulfonyl)imide, lithium bis(trifluoromethanesulfonyl)imide, or a mixture thereof;
a fluorinated sulfone; and
a fluorinated carbonate;
wherein the electrolyte is substantially free of non-fluorinated carbonates.

17. The electrochemical cell of claim 16, wherein the fluorinated sulfone is represented by Formula (I):

(I)

$R^1$ is alkyl or fluorinated alkyl;
$R^2$ is H, alkyl, fluorinated alkyl, aryl, or aralkyl; and
n is 1, 2, or 3.

* * * * *